(12) United States Patent
Stewart et al.

(10) Patent No.: US 6,548,770 B1
(45) Date of Patent: Apr. 15, 2003

(54) MULTIFUNCTION SWITCH STALK HAVING DISTAL END ELECTRICAL CONNECTION CONTACTS FOR USE WITH MOTOR VEHICLE STEERING COLUMNS

(75) Inventors: Trevor Stewart, Houghton-le-Spring (GB); Thomas Robson, Houghton-le-Spring (GB); Steven Humes, Houghton-le-Spring (GB)

(73) Assignee: TRW Electronics & Components GmbH & Co. KG (DE)

( * ) Notice: Subject to any disclaimer, the term of this patent is extended or adjusted under 35 U.S.C. 154(b) by 0 days.

(21) Appl. No.: 09/601,169

(22) PCT Filed: Nov. 5, 1998

(86) PCT No.: PCT/DE98/03230
§ 371 (c)(1),
(2), (4) Date: Feb. 12, 2001

(87) PCT Pub. No.: WO99/38729
PCT Pub. Date: Aug. 5, 1999

(30) Foreign Application Priority Data

Jan. 30, 1998 (DE) .......................... 198 03 693

(51) Int. Cl.$^7$ ................................ H01H 9/16
(52) U.S. Cl. ................. 200/61.27; 200/61.54
(58) Field of Search ............ 200/61.54, 61.28, 200/61.27; 439/15, 34

(56) References Cited

U.S. PATENT DOCUMENTS

| | | | |
|---|---|---|---|
| 4,404,438 A | * 9/1983 | Honjo | 200/61.54 |
| 5,854,458 A | * 12/1998 | Ramamurthy et al. | 200/61.54 |
| 5,967,300 A | * 10/1999 | Hecht et al. | 200/61.27 X |
| 6,127,638 A | * 10/2000 | Masuda et al. | 200/61.27 |

FOREIGN PATENT DOCUMENTS

| | | |
|---|---|---|
| DE | 196 49 912 A1 | 6/1998 |
| EP | 0601 462 B1 | 5/1997 |
| WO | WO 96/23677 | 8/1996 |

* cited by examiner

*Primary Examiner*—Renee Luebke
(74) *Attorney, Agent, or Firm*—Fay, Sharpe, Fagan, Minnich & McKee, LLP

(57) ABSTRACT

The invention relates to a stick shift, especially a steering column switch for motor vehicles with an, into a receiver part insertable, substantially stick-shaped part (3), in whose insert region (3*a*) are provided electrical connection contacts (25) for transmission of switching functions to the receiver part, and an actuating part (5) supported rotatably and/or displaceably inside or at the stick-shaped part (3) for actuation of switching functions, whereby the mechanism for realization of the switching functions is provided outside the insert area (3*a*) of the stick-shaped part (3).

18 Claims, 2 Drawing Sheets

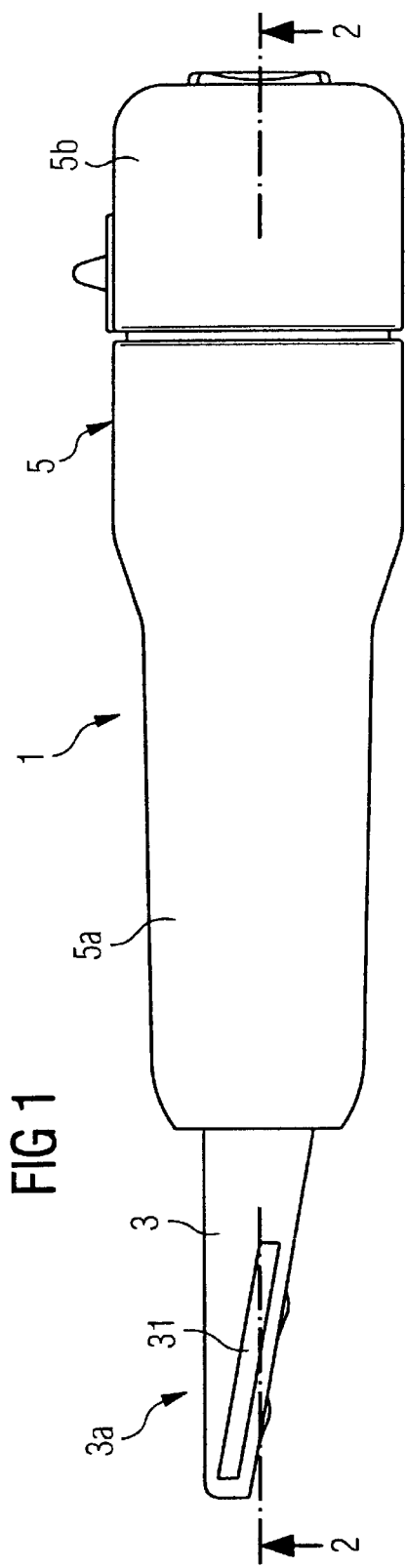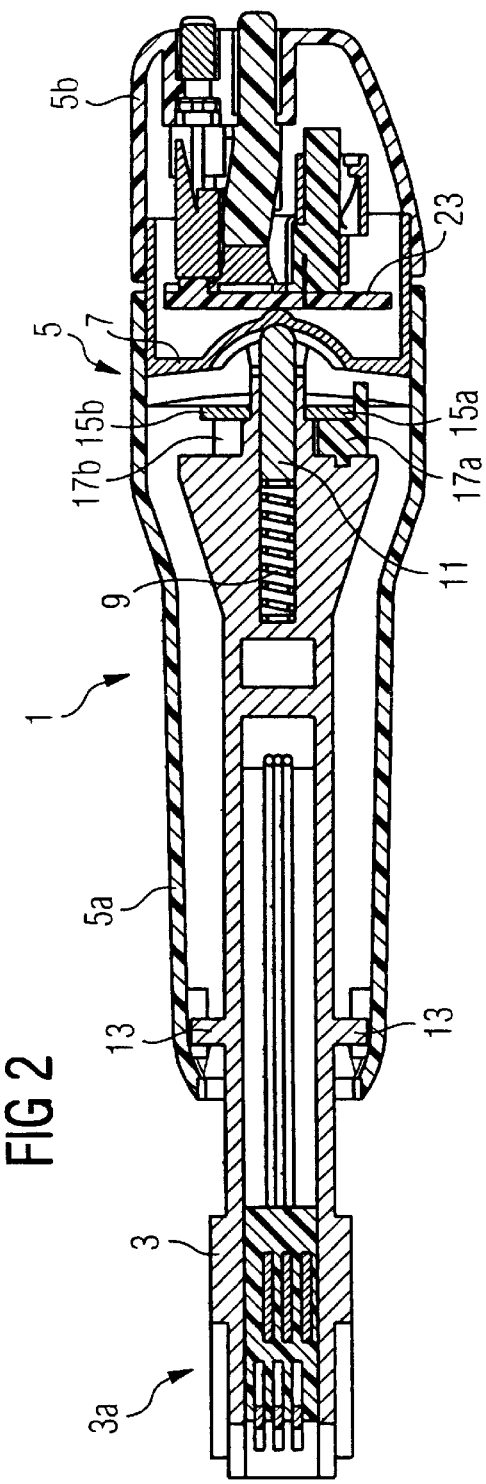

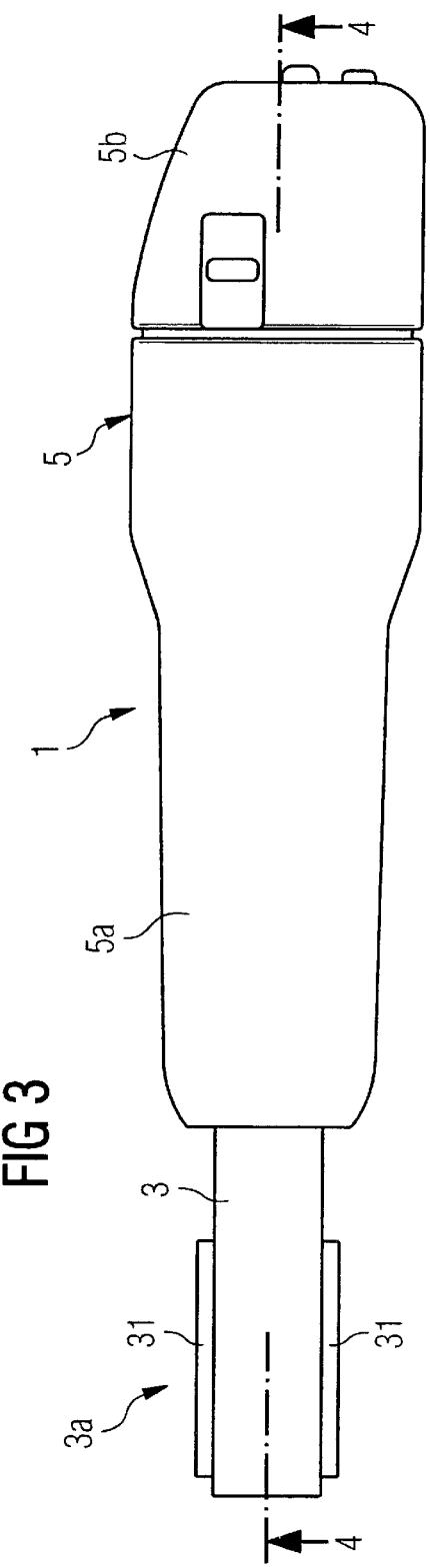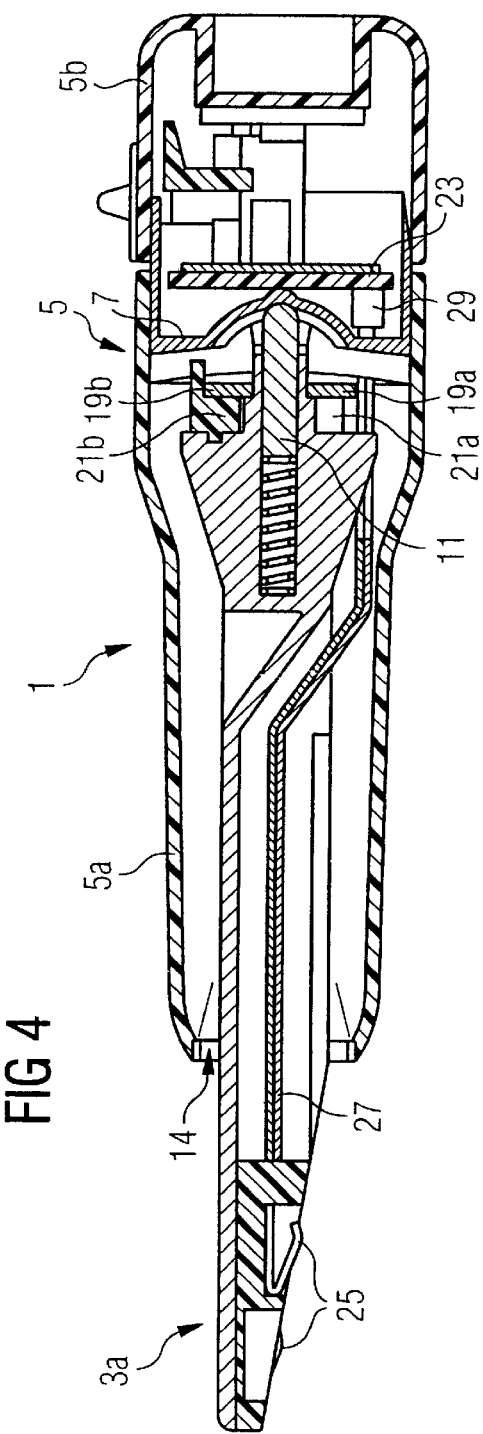

MULTIFUNCTION SWITCH STALK HAVING DISTAL END ELECTRICAL CONNECTION CONTACTS FOR USE WITH MOTOR VEHICLE STEERING COLUMNS

BACKGROUND OF THE INVENTION

The subject invention is directed toward the art of electrical switches and more particularly, to a multifunction switch stalk having electrical connection contacts on a distal end thereof for easy connection with associated components such as motor vehicle steering columns and the like.

The invention is especially well suited for use in connection with motor vehicles and will be described with particular reference thereto; however, the invention is capable of broader application and can be used for a variety of purposes in many environments.

Steering column switches of the type described are commonly used in the automotive industry for providing various electrical switching functions that can be easily selected by a motor vehicle operator. The steering column switches generally comprise a switch housing in which a stick-shaped elongate actuation element is supported for selective pivotable and/or rotatable motion. Typically, first locking means are provided in the switch housing, the first locking means are cooperative with second locking means provided at the end of an actuation lever for definition of switch positions. Through use of an appropriate stop curve when only certain tip functions are desired, it is possible to limit the functionality of the switch to only effect a reset of the switch lever into a home position. A switch of this type is described in EP-B-0 601 462.

In order to reduce the costs of maintaining a switch component inventory and to improve the flexibility in the selection of steering column switch functions, a modular steering column switch has been proposed. German Patent Application 196 049 912 describes one such modular steering column switch whose switch functions can be altered only through an exchange of the switch lever.

In addition to the consideration of providing the greatest possible flexibility in the selection of switch functions, in actual practice there often occurs the problem of limited available mounting space for different types of motor vehicles. That is, in the area of the steering column of the motor vehicles, there is oftentimes only a very limited space available for the installation of the steering column switch.

Owing to the persistent trend in recent times of providing an ever-increasing range of switch functions at the steering column switch such as through touch contacts or rotary type switches, the problem of limited installation space becomes more and more significant.

There is a need, therefore, for a multifunction steering column switch that can provide a wide range of electrical switching functions and that can be mounted in a small limited space.

SUMMARY OF THE INVENTION

The subject invention provides a multifunction steering column switch having electrical connection contacts on a distal end thereof for easy connection onto motor vehicle steering columns and requiring a minimum amount of mounting space. Overall, the present invention is based on the object of providing a multifunction switch stalk or stick shift, particularly a steering column switch for motor vehicles which requires very little space in the area of the installation site and which, in addition, affords a very high degree of flexibility in the selection of the switching functions.

In accordance with a preferred aspect of the invention, there is provided a multifunction switch stalk for use with a steering column of a motor vehicle. The switch stalk includes an elongate substantially stick-shaped member including an insert area on a distal end thereof for adapting the stick-shaped member for insertion into an association receiver part of the steering column of a motor vehicle. An actuating member is rotatably and/or displaceably arranged for movement relative to the stick-shaped member. The rotatable and/or displaceable relative movement between the stick-shaped member and the actuating member enables selective actuation of a plurality of switching functions provided by an associated switching mechanism disposed within the stick-shaped member. A set of electrical connecting contacts provided on the distal end of the stick-shaped member enable electrical switch function communication between the subject multifunction switch and the associated motor vehicle steering column. A minimum space requirement for installation of the switch of the invention is attained because electrical connection is established using connection contacts at the installation site between the switch stalk and the circuits or electrical consumers in the steering column that must be connected with the switch.

Therefore, in accordance with the present invention, all of the switching functions and all of the required mechanics and/or the electrical or electronic construction elements are placed outside of the installation area of the switch stalk and, rather, within the receiver part in the associated motor vehicle steering column. The stick shift or stalk according to the present invention provides, to that end, a substantially stick-shaped part having a plug-in area on a distal end thereof provided with electrical connection contacts for transmission of switch functions to the associated receiver part in the associated motor vehicle steering column. A rotatably and/or displaceably supported actuation component is connected with the stick-shaped part for actuation of the switch functions. In order to mount the switch stalk of the present invention, the distal end thereof is merely inserted into a corresponding insert area in a corresponding receptacle in a receptacle element, for example, the steering column of a motor vehicle, and is locked with same using suitable separable or non-separable hardware.

One important advantage of the present invention is a minimal space requirement in the installation area of the receiver element. According to the preferred specific embodiment of the invention, the actuating part envelops the stick-shaped member, at least in the outer region of the end of the stick-shaped part facing away from the insertion area and forms a housing for acceptance of the mechanics providing the switch functions.

Conversely, however, it is of course possible to widen the stick-shaped member in the area of the end facing away from the insert area to provide a space for acceptance of the mechanics providing the switching functions.

In addition, a combination of the above alternatives is intended when the housing is to be dimensioned relatively narrowly in cross section or if, correspondingly, numerous switching functions are to be integrated into a single switch stalk.

In accordance with another aspect of the preferred specific embodiment of the invention, the actuating part includes a head piece with provides a housing or a housing lid for covering the mechanics of the required additional switching functions. Consequently, in accordance with the invention, additional switching functions are realized by means of mere variation in the design of the head piece alone.

In accordance with yet a further aspect of the invention, a plate is provided in the actuating part for centralizing the electrical switching functions of the steering column switch and for providing second additional switching functions as needed. The plate is preferably formed in such a manner as to enable a predetermined maximum number of switching functions and/or certain selected different types of switching functions.

Accordingly, in order to select the desired switching functions, it is only necessary to provide the appropriate mechanism, preferably in the head piece of the actuating part, and to then join the connection contacts also to the plate.

In accordance with another aspect of the preferred specific embodiment of the invention, the required electrical connections are joined using an at least partially flexible connection line for joining the mechanisms providing the desired switching functions with the electrical connection contacts in the insertion area on the distal end of the switch stalk.

An analysis and control unit is disposed in typical application of the subject multifunction switch stalk in the associated motor vehicle steering column. The connection contacts of the subject switch stalk are beneficially connected with the analysis and control unit by insertion of the switch stalk into a corresponding receiver part in the motor vehicle steering column. In that way, an electrical connection is established between the analysis and control unit in the associated motor vehicle steering column and the switch positions and/or switching actions provided for in the switch stalk. Accordingly, based upon the switch position and/or switching actions of the individual switching devices, the analysis and control unit executes the desired switching functions in the motor vehicle. The analysis and control unit can be provided in a separate housing which is attachable inside or at the receiver part and is designed for acceptance of the insertion area of the subject stickshaped part.

Preferably, mechanical holding means for installation of the switch stalk at the associated receiver part in the associated motor vehicle steering column is formed in such a manner as to permit unlocking or simple detachment of the stick shift/stalk. This results in the benefit of simple exchangability of the. switch stalk in case of defect or of a simple retrofitting with added switching functions.

Still other advantages and benefits of the invention will become apparent to those of ordinary skill in the art upon a reading and understanding of the following detailed description.

BRIEF DESCRIPTION OF THE DRAWINGS

The invention may take physical form in certain parts and arrangements of parts, a preferred embodiment. of which will be described in detail in this specification and illustrated in the accompanying drawings which form a part hereof, and wherein:

FIG. 1 is a side elevational view of a multifunction switch stalk formed in accordance with the subject invention;

FIG. 2 is a longitudinal cross-sectional view of the switch stalk shown in FIG. 1 and taken along line A—A;

FIG. 3 is a top elevational view of the multifunction switch stalk shown in FIG. 1; and, FIG. 4 is a cross-sectional view of the multifunction switch stalk shown in FIG. 3 and taken along line B—B.

DETAILED DESCRIPTION OF THE PREFERRED EMBODIMENT

Referring now to the drawings wherein the showings are for the purposes of illustrating the preferred embodiment of the invention only and not for purposes of limiting same, FIG. 1 best shows the overall arrangement of a multifunction switch stalk system 1 formed in accordance with a preferred embodiment of the invention. The steering column switch system 1 includes a stick-shaped member 3 which engages an actuating part 5. The actuating part 5 surrounds part of the stick-shaped member 3 as shown and forms a housing for acceptance and mounting of a plurality of associated mechanism for performing all of the switching functions provided by the subject multifunction switch system.

Preferably, the actuating part 5 includes a first member 5a adapted to receive a catch element 7 as best shown in FIG. 2. Preferably, the catch element 7 is firmly arranged within the first part 5a and is provided with a single catch position so that by means of the actuating part 5, only tipping functions are realizable with the subject multifunction switch stalk illustrated. A spring-loaded catch rod 11 engages with the catch element 7 for defining a plurality of catch positions.

A plurality of lugs are provided at the stick-shaped part 3 and function to provide guidance during relative movement between the stick shaped part 3 and the actuating part 5. More particularly, the plurality of lugs enable swiveling of the actuating piece 5 in a single direction vertical relative to the drawing plane of FIG. 2. The swivel axis is defined by a suitable mechanism (not shown) in the area of the position of the catch rod 11 alongside the actuating part 5. In order to not block any swiveling movement in this direction, an engagement opening 14 is provided in the actuating part 5 such as shown in FIG. 4. The stick shaped part 3 protrudes through the engagement opening 14. Appropriate free play is provided in the vertical direction relative to the axis of rotation.

Appropriate opening and/or closing of a plurality of contacts within the subject multifunction switch system will be described with reference to FIG. 2. The actuating piece 5 is selectively swiveled relative to the actuating part 3. A plurality of contacts 15a, 15b are carried with movement of the actuating piece 5. In that way, when the actuating piece 5 is swiveled relative to the actuating part 3, the contacts 15a, 15b are shifted relative to the plurality of contacts 17a, 17b carried on the actuating member 3. As a result, an appropriate opening and/or closing of a contact is established.

Correspondingly, when swiveling the actuating piece 5 in a direction vertical relative to the drawing plane of FIG. 4, each one of a set. of additional contacts 19a, 19b is shifted relative to a counter contact respectively provided on another support piece 21a, 21b. Accordingly, this triggers an associated switching function. The axis of rotation is defined, in each of the above instances, by one of the lugs 13 which presents, for said purpose, an outer surface extending slightly obliquely relative to the longitudinal axis of the stick-shaped part 3.

As shown best in FIGS. 2 and 4, a plate 23 is provided in the outer end of the actuating part 3. The plate 23 serves for wiring the switching function. Preferably, all switching contacts are electrically connected with the plate 23. Electrical connection with the plate 23 applies as well with respect to the additional switching functions which can be selectively integrated into the actuating part 5 in the actuating area. These additional switching contacts may involve, as an example, additional separate touch-contact or rotational switches. The area provided for additional switching functions is covered by a head piece 5b of the actuating part 5. The head piece 5b serves simultaneously as a receiver and an installation piece for the additional switches.

A set of connection contacts 25 are provided on the distal end of the actuating part 5 comprising the subject multifunction switch stalk. The preferred centralization of all electrical contacts of all switches or switching functions results in the benefit that simple contacting is enabled by one or more electrical connection lines routed between the plate 23 and the distal end connection contacts 25. As shown in FIG. 4, two or more separate conductor ribbons 27 may, for example, be provided for connection with the plate 23 by means of one or more suitable connection plugs 29. The distal end connection contacts 25 are preferably formed on a one-sided conically tapering insert area 3a of the stick-shaped member 3. The connection contacts are provided in an area of a sloping side of the stick-shaped part 3 as shown. Preferably, the connection contacts are combined into two axially spaced apart groups, each connection contact of the two groups being connected with the plate 23 by means of one of the two connector ribbons 27.

In accordance with the present invention, preferably, the connection contacts 25 are formed as loop contacts with a hooked end so that upon insertion of the switch stalk 1 with its insert area 3a into an associated receiver element provided in an associated motor vehicle steering column (not shown), secure contacting is achieved with corresponding counter contacts.

In the insert area 3a as is apparent from FIGS. 1 and 3, laterally extending guidance ribs 31 are provided. These serve on the one hand for guidance when the switch stalk is inserted into the associated receiver piece in the associated motor vehicle steering column and, on the other hand, to provide torsional support and security to the subject switch stalk. At the same time, the guidance ribs 31 enable locking of the switch stalk into the associate receiver piece whereby, for example, an appropriate locking bar disposed in the associated motor vehicle steering column mechanically catches behind the rear edge of the guidance ribs 31.

As will be appreciated, the multifunction switch stalk system in accordance with the present invention provides the benefit of a minimum space requirement in the insert area or the installation area. Additionally, the subject switch stalk ensures extremely simple installation, and if needed, disassembly for exchange when a defect is found or for retrofitting of additional switch functions.

By providing all of the switch functions in the area of the head piece 5b of the actuating member 5 a modular construction is enabled whereby, in order to alter the additional switching functions, appropriate mechanisms can be simply integrated into the head piece 5b and/or the head piece 5b can be selectively modified as necessary without affecting the switching functions proper of the subject multifunction switch stalk defined by actuation of the actuating part.

The invention has been described with reference to the preferred embodiment. Obviously, modifications and alterations will occur to others upon a reading and understanding of this specification. As an example, the subject multifunction switch stalk can be formed in such fashion that the insert area 3a of the stick-shaped part 3 engages with a corresponding receiver element in a separate housing which is attachable at or outside of the associated receiver part in the associated motor vehicle steering column. The separate housing then is provided with contacts for connection with the appropriate electrical consumers or with another central control unit or for connection with an electrical bus system. At the same time, the required electronics for processing or converting the signals of the switch stalk may be provided within the separate housing. The required electronics would include the signals for the additional switching functions provided within the switch stalk. All such modifications and alterations are intended to be included insofar as they come within the scope of the appended claims or the equivalents thereof.

What is claimed is:

1. A stick shift, for use with a steering column of a motor vehicle, the stick switch comprising:
    an elongate substantially stick-shaped part including an insert area for adapting the stick-shaped part for insertion into an associated receiver part of the steering column of the motor vehicle;
    a plurality of electrical connection contacts disposed at the insert area of the stick-shaped part for transmission of first electrical switching functions from the stick shift to the receiver part; and,
    an actuating part arranged for movement relative to the stick-shaped part for selective actuation of said first switching functions provided by an associated switching mechanism disposed outside the insert area of the stick-shaped part.

2. The stick shift according to claim 1 wherein an outer area of and end of the stick-shaped part facing away from the insert area widens into a housing for acceptance of an associated switching mechanism providing electrical switching functions.

3. The stick shift according to claim 1 wherein the actuating part is shaped to envelop an outer area of an end of the stick-shaped part facing away from the insert area, the actuating part forming a portion of a housing for acceptance of the associated switching mechanism for the first switching functions.

4. The stick according to claim 2 further including additional actuating elements provided on at least a one of the stick-shaped part and the actuating part, the additional actuating elements being selectively movable to actuate second switching functions.

5. The stick shift according to claim 4 wherein the actuating part is a two-component part including a body part and a head part, the head part forming a housing for receiving the additional actuating elements.

6. The stick shift according to claim 5 further including a plate provided in the actuating part for wiring the first electrical switching functions of the stick shift and the second electrical switching functions.

7. The stick shift according to claim 4, further including:
    electrical connections for realization of the first and second electrical switching functions of the stick shift; and,
    an at least partially flexible connection line for connecting the electrical connections with the electrical connection contacts in the insert area of the stick shift.

8. The stick shift according to claim 4 further including first holding means provided at the insert area, said first holding means cooperating with associated second holding means provided in the associated receiver part for substantially rigid mounting and latching of the stick shift in the associated receiver part.

9. The stick shift according to claim 4 further including means provided in the insert area for guidance and torsional security and mounting of the stick shift in the associated receiver part.

10. A steering column switch unit comprising:

an elongate housing having a distal end for adapting the steering column switch unit for connection onto an associated steering column of an associated motor vehicle;

an actuation member arranged for selective movement relative to the elongate housing;

a switch mechanism disposed within a one of the elongate housing and the actuation member, the switch mechanism effecting a plurality of switching functions based on a position of the actuation member relative to the housing; and, a set of electrical connection contacts disposed on said distal end of the elongate housing and connected with said switch mechanism, the set of electrical connection contacts providing an electrical connection between the switch mechanism and the associated steering column of the associated motor vehicle when the distal end of the elongate housing is received onto the associated steering column.

11. The steering column switch according to claim 10 wherein the actuation member defines a housing for surrounding a portion of the elongate housing opposite from said distal end, the housing for receiving said switch mechanism.

12. The steering column switch unit according to claim 10 wherein the elongate housing includes a portion opposite from said distal end with a widened cross sectional area for receiving said switch mechanism.

13. The steering column switch unit according to claim 12 further including a flexible connection line for electrically connecting the set of electrical connection contacts with the switch mechanism.

14. The steering column switch unit according to claim 13 wherein the set of electrical connection contacts are resilient biased spring contacts.

15. The steering column switch unit according to claim 10 further including a plurality of secondary actuating elements disposed on a one of the elongate housing and the actuation member for effecting a plurality of secondary switching functions based on a relative position between said elongate housing and said actuation member.

16. The steering column switch unit according to claim 15 further including a flexible connection line, a first portion of the flexible connection line for electrically connecting the set of electrical connection contacts with said switch mechanism, and a second portion of the flexible connection line for electrically connecting a second portion of the set of electrical connection contacts with said plurality of secondary actuating elements.

17. The steering column switch unit according to claim 16 wherein said set of electrical connection contacts are resiliently biased spring contacts.

18. In combination with a steering column switch unit including an elongate housing having a distal end for adapting the steering column switch unit for connection onto an associated steering column of an associated motor vehicle, an actuation member arranged for selective movement relative to the elongate housing, and a switch mechanism disposed on at least one of the elongate housing and the actuation member for effecting a plurality of switching functions based on the relative position between the elongate housing and the actuation member: a set of electrical connection contacts disposed on said distal end of the elongate housing and connected to the switch mechanism, the set of electrical connection contacts providing an electrical connection between the switch mechanism and the associated steering column when the distal end of the elongate housing is selectively receivable onto the associated steering column.

* * * * *